No. 851,573. PATENTED APR. 23, 1907.
L. A. TYC, G. BOIVIN & L. N. BENJAMIN.
PLASTIC STRUCTURE.
APPLICATION FILED NOV. 15, 1906.

Witnesses.
Lloyd Blackmore
D. W. Colton.

Inventors.
Ludwig Adam Tyc
Guillaume Boivin and
Louis Napoleon Benjamin
by C. J. Fetherstonhaugh Atty.

UNITED STATES PATENT OFFICE.

LUDWIG ADAM TYC, GUILLAUME BOIVIN, AND LOUIS NAPOLEON BENJAMIN, OF MONTREAL, QUEBEC, CANADA, ASSIGNORS TO IDEAL CONCRETE, LIMITED, OF MONTREAL, CANADA, A CORPORATION OF CANADA.

PLASTIC STRUCTURE.

No. 851,573.     Specification of Letters Patent.     Patented April 23, 1907.

Application filed November 15, 1906. Serial No. 343,603.

*To all whom it may concern:*

Be it known that we, LUDWIG ADAM TYC, a subject of the Czar of Russia, GUILLAUME BOIVIN, a subject of the King of Great Britain, and LOUIS NAPOLEON BENJAMIN, a citizen of the United States of America, residing at 226 Chatham street, in the city and district of Montreal, in the Province of Quebec, in the Dominion of Canada, have invented certain new and useful Improvements in Plastic Structures, of which the following is a specification.

This invention relates to improvements in plastic structures, and the objects of the invention are to enhance the appearance of surfaces covered with plastic composition, to simplify the methods of arranging ornamental designs in said plastic composition over said surface and generally to provide a durable ornamental covering for a floor, wall, ceiling or other surface, as an effective substitute for more expensive construction, and it consists essentially of a shaped piece of plastic material in its consistent state mounted on a suitable base and plastic material applied in its plastic state and adjoining said shaped piece.

Figure 1:
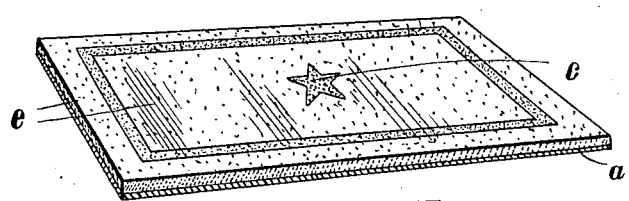
Figure 2:
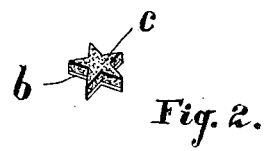
Figure 3:
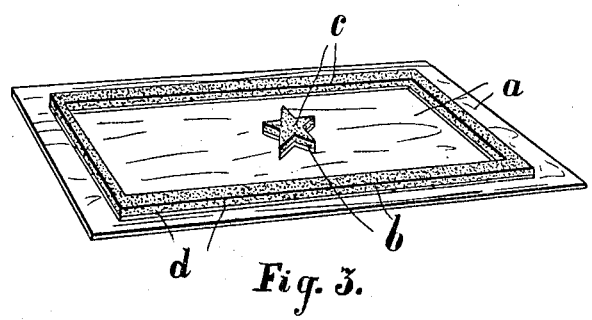

In the drawings, Figure 1 is a sectional perspective view of a surface covered with an arrangement of plastic material following the invention. Fig. 2 is a detail of an ornamental piece of plastic material mounted on its base. Fig. 3 is a sectional perspective detail of the ornamental piece of plastic material on its base and attached to the surface previous to the covering of the said surface with the adjoining plastic material.

Referring to the drawings, $a$ is the surface to be covered, which may be a floor, ceiling, wall or any other surface.

$b$ is a base of wood, card-board, cloth or any suitable material.

$c$ is a composition of matter of a plastic nature preferably comprising carbonate of magnesia, gravels or sands and coloring matter mixed with chlorid of magnesia and water, but it must be understood that the ingredients of the plastic material may be changed from time to time. Oxychlorin of zinc may be an essential part to the mixture, in fact any suitable ingredients which will form a plastic mass having consistent properties on drying out, and which will fully meet the requirements in the plastic composition $c$.

The base $b$ may be of any suitable shape, such as thin board or any length of suitable material and the composition of matter $c$ applied thereon in its plastic state and suitably dried out to its consistent state, the base and plastic material $c$ may be sawed into any suitable shape or design for ornamental or other purposes, each shape having its own portion of base. These pieces are then secured in any suitable manner to the surface $a$ either by the nails $d$ driven through the edge of the base $b$, or by any suitable adhesive material. The plastic material $e$ formed of a composition of matter, having the same properties as the plastic material $c$, is then spread over the surface $a$ up to the edges of the plastic material $c$, which it adjoins thus completely filling in between the shapes $c$ and dried out to its consistent state. This covering in its plastic state forms a perfect joint with the edges of the shapes of plastic material $c$ thus bringing out the ornamentation produced by the shapes. The surface may be finally polished and treated with a coat of oil or other suitable finish.

Any suitable coloring matter may be included in either of the plastic composition when mixing and it is preferable to have them of different colors throughout for then the design is brought out in a much more pronounced manner.

The shaped pieces $c$ of plastic material may be made in any suitable manner and in place of sawing them from a board they may be molded or formed otherwise.

What we claim as our invention is:

1. In a plastic structure, the combination with the surface to be covered, of a pattern piece formed of a plastic material in its consistent state and a base of precisely similar pattern to the shape indicated by said plastic material and adhering thereto and of material adaptable for securing the pattern piece to the surface, and a plastic filling around one or more of said pattern pieces and therewith forming the covering to said surface, substantially as described.

2. In a plastic structure, the combination with the surface to be covered, of a pattern piece formed of a plastic material in its consistent state and a wooden base, having its outline formation precisely similar to the shape of the pattern made by said plastic material nails or brads securing said base to said surface, and a plastic filling around one or more pattern pieces and forming therewith the covering to said surface, substantially as described.

3. In a plastic structure, the combination with the surface to be covered, of a plurality of pattern pieces formed of a plastic compound in its consistent state covering and adhering to a board base and separated with said base in its consistent state into said pattern pieces, said bases in outline formation being of precisely similar shape to the pattern formed by said plastic compound means for securing the bases adhering to the various pattern pieces to the surface to be covered, and a plastic compound filling around said pattern pieces, substantially as described.

4. In a device of the class described, in combination, a flooring, a pattern piece formed of a plastic compound in its consistent state and a base, having its outline formation precisely similar to the shape indicated by the pattern and adapted to receive nails or brads, adhering to said compound, and a plastic compound forming the background for the said patterns, substantially as described.

Signed at the city of Montreal, in the district of Montreal, in the Province of Quebec, in the Dominion of Canada, this eighth day of November, 1906.

LUDWIG ADAM TYC.
GUILLAUME BOIVIN.
LOUIS NAPOLEON BENJAMIN.

Witnesses to signature of all parties hereto:
LLOYD BLACKMORE,
D. W. COTTON.